United States Patent
Kumar et al.

(10) Patent No.: US 11,086,937 B2
(45) Date of Patent: Aug. 10, 2021

(54) SPEECH BASED STRUCTURED QUERYING

(71) Applicant: The Regents of the University of California, Oakland, CA (US)

(72) Inventors: Arun Kumar, San Diego, CA (US); Vraj Shah, La Jolla, CA (US); Dharmil Chandarana, Bellevue, WA (US)

(73) Assignee: The Regents of the University of California, Oakland, CA (US)

( * ) Notice: Subject to any disclaimer, the term of this patent is extended or adjusted under 35 U.S.C. 154(b) by 177 days.

(21) Appl. No.: 16/409,159

(22) Filed: May 10, 2019

(65) Prior Publication Data

US 2019/0347298 A1   Nov. 14, 2019

Related U.S. Application Data

(60) Provisional application No. 62/670,657, filed on May 11, 2018.

(51) Int. Cl.
*G06F 16/9032* (2019.01)
*G06F 40/284* (2020.01)
*G10L 15/26* (2006.01)

(52) U.S. Cl.
CPC ...... *G06F 16/90332* (2019.01); *G06F 40/284* (2020.01); *G10L 15/26* (2013.01)

(58) Field of Classification Search
CPC ................................... G06F 16/90332
USPC .......................................... 704/9
See application file for complete search history.

(56) References Cited

U.S. PATENT DOCUMENTS

| | | | | |
|---|---|---|---|---|
| 9,904,668 B2* | 2/2018 | Bruno | | G06F 40/205 |
| 9,972,304 B2* | 5/2018 | Paulik | | G10L 15/30 |
| 10,283,111 B1* | 5/2019 | Mairesse | | G10L 15/22 |
| 10,319,374 B2* | 6/2019 | Catanzaro | | G10L 15/063 |
| 10,332,509 B2* | 6/2019 | Catanzaro | | G10L 25/21 |

(Continued)

OTHER PUBLICATIONS

Priest, David, et al., "Every Alexa command you can give you Amazon Echo smart speaker." <https://www.cnet.com/how-to/amazon-echo-the-complete-list-of-alexa-commands/>, Apr. 2, 2020.

(Continued)

*Primary Examiner* — Susan I McFadden
(74) *Attorney, Agent, or Firm* — Mintz Levin Cohn Ferris Glovsky and Popeo, P.C.

(57) ABSTRACT

A method may include receiving, from a client, a query dictated by a user. The query may request to retrieve, from a database, data stored in the database. A structure determination may be performed by identifying one of a plurality of ground truth query strings having a minimum edit distance relative to a transcription of the dictated query. Each the plurality of ground truth query strings may be consistent with at least a syntax of a query language associated with the dictated query. A rendered query string is generated by performing a literal determination that includes by comparing a literal token in the identified ground truth query string to one or more literal tokens present in the database. The rendered query string may be executed to retrieve, from the database, data requested by the dictated query string. Related methods and computer program products are also provided.

19 Claims, 9 Drawing Sheets

(56) References Cited

U.S. PATENT DOCUMENTS 10,635,949 B2 * 4/2020 Soldevila ........... G06K 9/00852

OTHER PUBLICATIONS

MySQL: Employees Sample Database. <https://dev.mysql.com/doc/employee/en/>, 8 pages.
Nuance Healthcare, "360 | SpeechMagic SDK: Deeply embed advanced speech recognition capabilities." Product Sheet, <https://www.nuance.com/content/dam/nuance/en_us/collateral/healthcare/product-sheet/ps-360-speechmagic-sdk-en-us>, 2 pages.
Harper, Sue, "Building Queries Visually—Use point-and-click, drag-and-drop, and query builder in Oracle SQL Developer." <https://blogs.oracle.com/oraclemagazine/building-queries-visually>, Mar./Apr. 2008, 6 pages.
SQL Grammar—Phoenix Language Reference. <http://forcedotcom.github.io/phoenix/>, 13 pages.
Amodei, Dario, et al., "Deep Speech 2: End-to-End Speech Recognition in English and Mandrain." *Proceedings of the 33rd International Conference on Machine Learning*, vol. 48, 2016, 10 pages.
Chandarana, Dharmil et al., "SpeakQL: Towards Speech-driven Multi-modal Querying." *ACM SIGMOD HILDA Workshop*, 2017, 6 pages.
Crotty, Andrew, et al., "Vizdom: Interactive Analytics through Pen and Touch." *VLDB Demo* 2014, 4 pages.
Hinton, Geoffrey, et al., "Deep Neural Networks for Acoustic Modeling in Speech Recognition." *Signal Processing Magazine*, Apr. 27, 2012, 27 pages.
Lajoie, Stephane, et al., "Application of Spoken and Natural Language Technologies to Lotus Notes Based Messaging and Communication." dtic.mil/dtic/tr/fulltext/u2/a402014, 2002, 43 pages.
Li, Fei, et al., "Constructing an Interactive Natural Language Interface for Relational Databases." *Proceedings of the VLDB Endowment*, vol. 8, No. 1, 2014, 12 pages.
Lyons, Gabriel, et al., "Making the case for Query-by-Voice with EchoQuery." *SIGMOD Demo*, 2016, 4 pages.
Matsuzaki, Takuya, et al., "Probabilistic CFG with latent annotations." *Proceedings of the 43rd Annual Meeting of the ACL*, Jun. 2005, pp. 75-82, 8 pages.
Nandi, Arnab, et al., "Gestural Query Specification." *Proceedings of the VLDB Endowment*, vol. 7, No. 4, 2013, 12 pages.
Ruan, Sherry, et al. "Comparing Speech and Keyboard Text Entry for Short Messages in Two Languages on Touchscreen Phones." *Proceedings of the ACM on Interactive, Mobile, Wearable and Ubiquitous Technologies*, vol. 1, No. 4, Article 159, Dec. 2017, 23 pages.
Zloof, M. M. "Query-by-Example: a data base language." *IBM Systems Journal*, vol. 16, No. 4, 1977, pp. 324-343, 20 pages.
Rabiner, Lawrence, et al., *"Fundamentals of Speech Recognition."* Prentice-Hall, Inc., 1993.

* cited by examiner

|  | Ground Truth Query String 330 | | | | |
|---|---|---|---|---|---|
|  |  | SELECT | * | FROM | x |
| Masked Transcription 310 |  | 0 | 1.2 | 2.3 | 3.5 | 4.5 |
|  | SELECT | 1.2 | 0 | 1.1 | 2.3 | 3.3 |
|  | x | 2.2 | 1 | 2.1 | 3.3 | 2.3 |
|  | x | 3.2 | 2 | 3.1 | 4.3 | 3.3 |
|  | FROM | 4.4 | 3.2 | 4.3 | 3.1 | 4.1 |
|  | x | 5.4 | 4.2 | 5.3 | 4.1 | 3.1 |

SPEECH BASED STRUCTURED QUERYING

RELATED APPLICATION

This application claims priority to U.S. Provisional Application No. 62/670,657 entitled "SYSTEM FOR SPOKEN WORDS" and filed on May 11, 2018, the disclosure of which is incorporated herein by reference in its entirety.

STATEMENT OF GOVERNMENT SPONSORED SUPPORT

This invention was made with government support under Grant Number NSF 1816701 awarded by the National Science Foundation. The government has certain rights in the invention.

TECHNICAL FIELD

The subject matter described herein relates generally to speech recognition and more specifically to transcribing spoken structured queries.

BACKGROUND

User interfaces may enable interactions between humans and a variety of devices including, for example, smartphones, tablet computers, wearables, virtual assistants, Internet-of-Things (IoT) appliances, and/or the like. A typical user interface may include a keyboard and/or a touchscreen configured to receive touch-based inputs. However, touch-based inputs may be inconvenient and/or impractical in some contexts. For example, using a touchscreen to input a lengthy or complex text string may be an especially onerous task. As such, many modern devices may also include speech-recognition capabilities to support speech-based inputs. For many devices and/or applications, speech-based inputs may be more intuitive and less cumbersome than touch-based inputs.

SUMMARY

Systems, methods, and articles of manufacture, including computer program products, are provided for processing a spoken query on structured data. In some example embodiments, there is provided a system that includes at least one processor and at least one memory. The at least one memory may include program code that provides operations when executed by the at least one processor. The operations may include: receiving, from a client, a query dictated by a user, the query requesting to retrieve, from a database, at least a portion of data stored in the database; performing, based at least on a transcription of the dictated query, a structure determination by at least identifying, in a plurality of ground truth query strings, a ground truth query string having a minimum edit distance relative to the transcription of the dictated query, each the plurality of ground truth query strings being consistent with at least a syntax of a query language associated with the dictated query; generating a rendered query string by at least performing a literal determination to identify a first literal token included in the identified ground truth query string, the literal determination being performed by a least comparing the first literal token to one or more literal tokens present in the database; and executing the rendered query string to at least retrieve, from the database, data requested by the dictated query string.

In some variations, one or more features disclosed herein including the following features can optionally be included in any feasible combination. An edit distance between the transcription of the dictated query and at least one of the plurality of ground truth query strings may be determined. The edit distance may correspond to a quantity of operations to transform the transcription of the dictated query into the at least one of the plurality of ground truth query strings. The transformation may include editing a first token and a second token included in the transcription of the dictated query. The first token and the second token may each be a literal token, a keyword token, or a special character token included in the transcription of the dictated query. The edit distance may be further determined by at least assigning, to each of a first operation editing the first token and a second operation editing the second token, a different weight corresponding to a respective type of the first token and the second token.

In some variations, the plurality of ground truth query strings are stored in an index including a first trie and a second trie, wherein the first trie stores at least one ground truth query string having a first quantity of tokens, and wherein the second trie stores at least one ground truth query string having a second quantity of tokens. A minimum possible edit distance relative to the transcription of the dictated query may be determined. The structure determination may be performed by at least traversing the second trie but not the first trie based at least on the minimum possible edit distance of the first trie being greater than an actual minimum edit distance relative to the transcription of the dictated query.

In some variations, the plurality of ground truth strings may be stored in a plurality of inverted indices. Each of the plurality of inverted indices may enumerate one or more ground truth query strings containing a keyword from a lexicon of the query language associated with the dictated query.

In some variations, a category may be assigned, based at least on the syntax of the query language associated with the dictated query, to the first literal token included in the identified ground truth query string. The first literal token may be compared to a second literal token present in the database under a same category. The category may be a table name, an attribute name, or an attribute value. The comparing may include comparing a first phonetic representation of the first literal token to a second phonetic representation of the second literal token. The second literal token may be identified as a match for the first literal token based at least on the second literal token having a minimum character level edit distance relative to the first literal token.

In some variations, the first literal token may be adjacent to a third literal token in the identified ground truth query string. The literal determination may be further performed by at least comparing, to second literal token from the database, each literal token from a set including the first literal token, the third literal token, and a fourth literal token formed by combining the first literal token and the third literal token. The second literal token may be identified as the match for the first literal token instead of a fifth literal token from the database based at least on the second literal token having the minimum character level edit distance relative to a larger portion of the set than the fifth literal token.

In some variations, a user interface may be generated for display at the client. The user interface may be configured to receive, from the user, one or more inputs correcting the rendered query string. The user interface may include a first input element corresponding to a keyword token or a special character token consistent with a lexicon of the query language. The user interface may further include a second input element corresponding to a second literal token present in the database.

In some variations, an input selecting a clause in the rendered query string may be received via the user interface. The rendered query string may be corrected by at least reprocessing the selected clause from the rendered query string.

In some variations, the transcription of the dictated query may be generated by at least applying, to an audio signal corresponding to the dictated query, an automatic speech recognition technique.

In some variations, the structure determination may be performed based on a masked transcription generated by at least replacing the first literal token with a placeholder.

In some variations, the query language may include a structured query language.

In another aspect, there is provided a method for processing a spoken query on structured data. The method may include: receiving, from a client, a query dictated by a user, the query requesting to retrieve, from a database, at least a portion of data stored in the database; performing, based at least on a transcription of the dictated query, a structure determination by at least identifying, in a plurality of ground truth query strings, a ground truth query string having a minimum edit distance relative to the transcription of the dictated query, each the plurality of ground truth query strings being consistent with at least a syntax of a query language associated with the dictated query; generating a rendered query string by at least performing a literal determination to identify a first literal token included in the identified ground truth query string, the literal determination being performed by a least comparing the first literal token to one or more literal tokens present in the database; and executing the rendered query string to at least retrieve, from the database, data requested by the dictated query string.

In another aspect, there is provided a computer program product that includes a non-transitory computer readable storage medium. The non-transitory computer-readable storage medium may include program code that causes operations when executed by at least one data processor. The operations may include: receiving, from a client, a query dictated by a user, the query requesting to retrieve, from a database, at least a portion of data stored in the database; performing, based at least on a transcription of the dictated query, a structure determination by at least identifying, in a plurality of ground truth query strings, a ground truth query string having a minimum edit distance relative to the transcription of the dictated query, each the plurality of ground truth query strings being consistent with at least a syntax of a query language associated with the dictated query; generating a rendered query string by at least performing a literal determination to identify a first literal token included in the identified ground truth query string, the literal determination being performed by a least comparing the first literal token to one or more literal tokens present in the database; and executing the rendered query string to at least retrieve, from the database, data requested by the dictated query string.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1A:
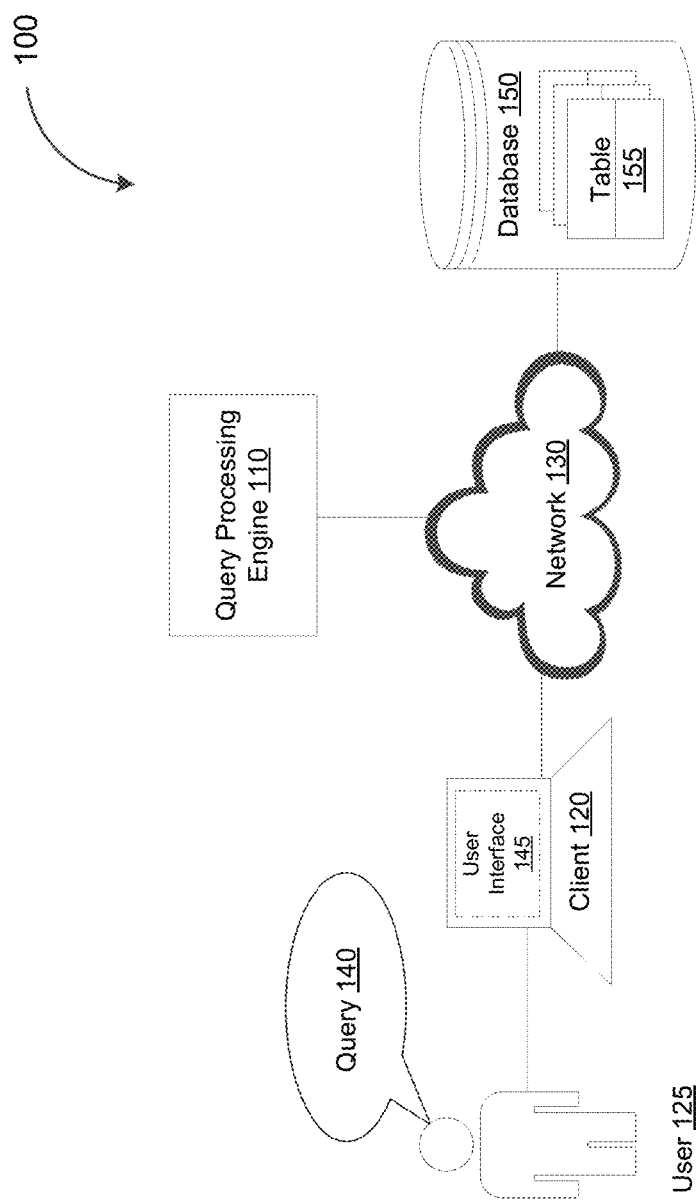
FIG. 1A depicts a system diagram illustrating an example of a query processing system, in accordance with some example embodiments.

Many modern devices may rely on natural language processing (NPL) techniques in order to support speech-based inputs. Nevertheless, conventional natural language processing techniques may have limited ability to parse and detect the semantics of natural language. For example, conventional natural language processing techniques may be thwarted by the grammatical complexities of natural languages, which give rise to ambiguities in which a word and/or phrase present in a sentence may be ascribed multiple meanings depending on context. The limitations associated with conventional natural language processing techniques may extend to languages with unambiguous context-free grammar (CFG) including, for example, structured query language (SQL) and/or the like. As such, conventional natural language processing techniques may be unsuitable for processing structured queries. Structured queries may be formed using a query language with unambiguous context-free grammar. Moreover, structured queries may be configured to retrieve, from a database, structured data. Conventional natural language processing techniques may be suboptimal for processing structured queries at least because conventional natural language processing techniques do not exploit the structure that is present in structured queries or the structure that is present in the data being retrieved by structured queries.

In some example embodiments, a query processing engine may be configured to process a spoken structured query (e.g., an audio signal corresponding to the spoken structured query) based at least on the context-free grammar of the underlying query language. The spoken structured query may be first undergo automatic speech recognition even though the resulting transcription may include one or more errors. That is, the transcribed query may include one or more tokens that do not correspond to the tokens present in the original structured query. For instance, the query processing engine may apply an automatic speech recognition technique that fails to differentiate between certain homophones. Alternatively and/or additionally, the automatic speech recognition technique may split a single token in the original structured query into a series of tokens in the transcribed query. The query processing engine may therefore augment the transcribed query by performing a structure determination to identify a syntactically correct query string corresponding to the original structured query. Furthermore, the query processing engine may augment the transcribed query by performing a literal determination to identify the literals that are present in the original structured query. Performing the structure determination and the literal determination may correct at least some of the automatic speech recognition errors that may present in the transcribed query.

As noted, the query processing engine may perform structure determination on the transcription of the structured query in order to identify a syntactically correct query string that corresponds to the original structured query. In some example embodiments, the query processing engine may identify, based on a dictionary including at least a portion of the lexicon of the underlying query language, tokens that correspond to one or more keywords and special characters. The remaining tokens may be identified as literals, which are replaced with neutral placeholders to generate a masked version of the transcribed query. A syntactically correct query string that corresponds to the original structured query may be identified by at least performing a similarity search across an index of ground truth query strings. For example, the query processing engine may search the index of ground truth query strings to identify a ground truth query string having a minimal edit distance relative to the transcribed query. It should be appreciated that the query processing engine may perform the structure determination while being agnostic to the literals that are present in the transcribed query. For instance, the query processing engine may compute the edit distance between the ground truth query strings and the masked version of the transcribed query in which tokens corresponding to literals have been replaced with neutral placeholders.

In some example embodiments, the query processing engine may perform literal determination on the transcribed query by at least assigning, based on the grammar of the underlying query language, a category to each of the literal tokens present in the syntactically correct query string corresponding to the transcribed query. For example, each literal token in the syntactically correct query string may be designated as a table name, an attribute name, or an attribute value. To mitigate the unbounded vocabulary problem, the query processing engine may identify the literal tokens present in the syntactically correct query string by at least comparing the literal tokens to only those tokens that are present in the database under the same category. For instance, the query processing engine may identify a literal token in the syntactically correct query string that has been designated as a table name by comparing that literal token only to the table names that are present in the database. Moreover, the query processing engine may identify the literal token in the syntactically correct query string by at least computing an edit distance between the phonetic representation of that literal token and the phonetic representations of the tokens present in the database.

FIG. 1A depicts a system diagram illustrating an example of a query processing system 100, in accordance with some example embodiments. Referring to FIG. 1A, the query processing system 100 may include a query processing engine 110. As shown in FIG. 1A, the query processing engine 110 may be communicatively coupled to a client 120 via a network 130. The client 120 may be any processor-based device including, for example, a smartphones, a tablet computer, a wearable, a virtual assistant, an Internet-of-Things (IoT) appliance, and/or the like. Meanwhile, the network 130 may be any wired and/or wireless network including, for example, a local area network (LAN), a virtual local area network (VLAN), a wide area network (WAN), a public land mobile network (PLMN), the Internet, and/or the like. Although FIG. 1A depicts a remote and/or cloud-based deployment of the query processing engine 110 in which the query processing engine 110 accessed via the network 130, it should be appreciated that at least a portion of the functionalities associated with the query processing engine 110 may be deployed locally, for example, at the client 120 as software, hardware, or a combination thereof.

Referring again to FIG. 1A, a user 125 may provide, to the client 120, a speech-based input including, for example, a query 140. The query 140 may be formed from a query language having an unambiguous context-free grammar including, for example, structured query language (SQL) and/or the like. Moreover, the query 140 may be configured to access structured data stored in a database 150, for example, in a table 155. In some example embodiments, the query processing engine 110 may be configured to process the query 140 based at least on the context-free grammar of the underlying query language. For instance, the query 140 may first undergo automatic speech recognition to generate a transcription of the query 140. The query processing engine 110 may perform, on the transcription of the query 140, a structure determination and a literal determination to correct at least some of the errors that may be present in the transcription of the query 140. Alternatively and/or additionally, the query processing engine 110 may generate a user interface 145, which may be displayed at the client 120 to at least enable the user 125 to perform an interactive correction of the one or more errors that may be present in the transcription of the query 140 after structure determination and literal determination.

Figure 1B:
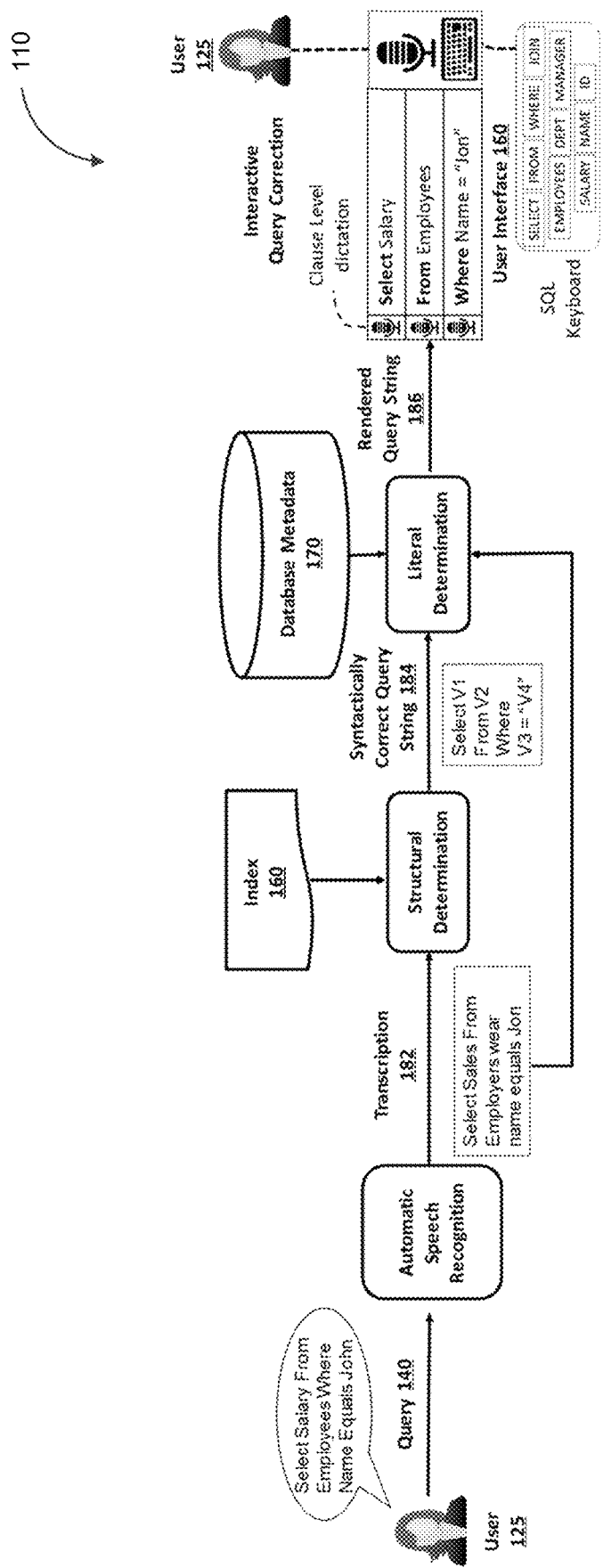
FIG. 1B depicts a block diagram illustrating an example of a process for processing a query, in accordance with some example embodiments.

To further illustrate, FIG. 1B depicts a block diagram illustrating an example of a process 115 for processing the query 140, in accordance with some example embodiments. Referring to FIGS. 1A-B, the client 120 may receive, from the user 125, a speech-based input including the query 140. The query processing engine 110 may apply, to an audio signal corresponding to the query 140 received from the client 120, an automatic speech recognition technique including, for example, a hidden Markov model, dynamic time warping (DTW), a neural network, a connectionist temporal classification model, an attention-based model, and/or the like. However, the resulting transcription 182 of the query 140 may include one or more errors. For example, the transcription 182 may include one or more tokens that do not correspond to the tokens that are actually present in the query 140. To correct the errors that may be present in the transcription 182, the query processing engine 110 may further process the transcription 182 by at least performing a structure determination and a literal determination.

As shown in FIG. 1B, the query processing engine 110 may perform a structure determination to identify a syntactically correct query string 184 corresponding to the transcription 182. The structure determination may be performed based at least on an index 160 that includes a plurality of ground truth query strings. For instance, the index 160 may include one or more data structures (e.g., trie, directed acyclic graph (DAG), reverse index, and/or the like) that are optimized for the search of a ground truth query string having a minimum edit distance relative to the transcription 182. It should be appreciated that the syntactically correct query string 184 may be a ground truth query string from the 160 having a minimum edit distance relative to the transcription 182. Moreover, the query processing engine 110 may perform the structure determination while being agnostic to the literals that are present in the transcription 182 of the query 140. For example, the structure determination may be performed based on a masked version of the transcription 182 in which literal tokens have been replaced with neutral placeholders.

Referring again to FIG. 1B, the query processing engine 110 may perform a literal determination to identify the literals that are present in the syntactically correct query string 184 corresponding to the transcription 182 of the query 140. For instance, in some example embodiments, the query processing engine 110 may perform the literal determination by at least assigning, based on the grammar of the underlying query language, a category to each of the literal tokens present in the syntactically correct query string 184. To mitigate the unbounded vocabulary problem, the query processing engine 110 may perform the literal determination based on a metadata 170 associated with the database 150. For example, the query processing engine 110 may identify the literal tokens present in the syntactically correct query string 184 by at least comparing the literal tokens to only those literal tokens that are present in the database 150 under a same category.

Figure 2:
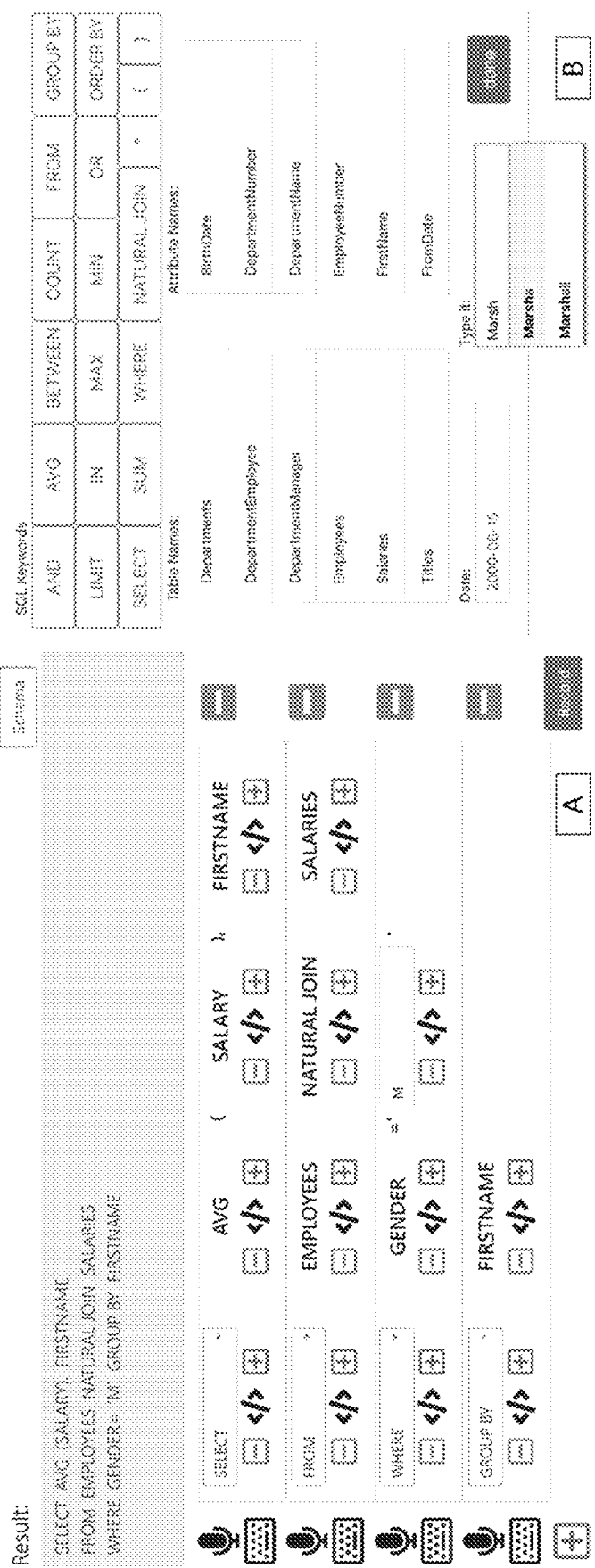
FIG. 2 depicts an example of a user interface, in accordance with some example embodiments.

As noted, the query processing engine 110 may perform the structure determination and the literal determination to correct at least some of the errors that may be present in the transcription 182 of the query 140. Nevertheless, the resulting rendered query string 186 may still include one or more errors. As such, in some example embodiments, the query processing engine 110 may generate the user interface 145, which may be displayed at the client 120 at least enable the user 125 to perform an interactive correction of the one or more errors remaining in the rendered query string 186. FIG. 2 depicts an example of the user interface 145, in accordance with some example embodiments. For instance, as shown in FIG. 2, the user interface 145 may include input elements (e.g., buttons, checkboxes, buttons, sliders, drop lists, and/or the like) corresponding to at least a portion of the lexicon of the underlying query language including, for example, keywords, special characters, and/or the like. Alternatively and/or additionally, the user interface 145 may include input elements corresponding to at least a portion of the literal tokens (e.g., table names, attribute names, attribute values, and/or the like) that are present in the database 150.

In some example embodiments, the user interface 145 may enable the user 125 to edit individual clauses within the rendered query string 186, for example, by replacing one or more of the tokens (e.g., keyword tokens, special character tokens, and/or literal tokens) present in the rendered query string 186. The user 125 may replace the one or more tokens by at least selecting one or more of the input elements presented on the user interface 145 displayed at the client 120. Alternatively and/or additionally, the user 125 may edit an individual clause within the rendered query string 186 by dictating the clause for reprocessing by the query processing engine 110. The user 125 may also dictate the query 140 in its entirety in order for the query processing engine 110 to reprocess, in whole or in part, the query 140.

Figure 3A:
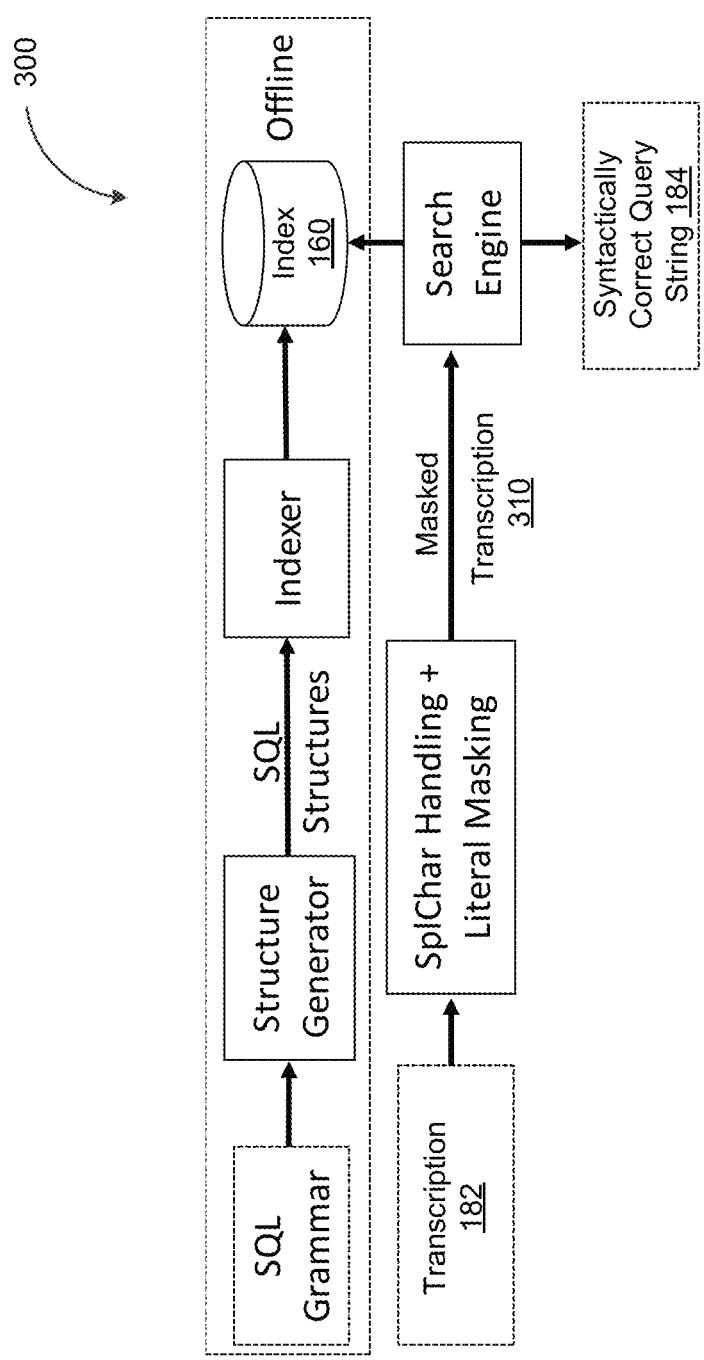
FIG. 3A depicts a block diagram illustrating an example of a process for structure determination, in accordance with some example embodiments.

FIG. 3A depicts a block diagram illustrating an example of a process 300 for structure determination, in accordance with some example embodiments. Referring to FIG. 3A, the query processing engine 110 may generate one or more dictionaries that include at least a portion of the lexicon of a query language associated with the query 140 such as, for example, structured query language (SQL) and/or the like. For instance, the query processing engine 110 may generate a keyword dictionary for keywords that include, for example, SELECT, FROM, WHERE, ORDER BY, GROUP BY, NATURAL JOIN, AND, OR, NOT, LIMIT, BETWEEN, IN, SUM, COUNT, MAX, AVG, MIN, and/or the like. Alternatively and/or additionally, the query processing engine may generate a special character dictionary for special characters including, for example, "*", "=", "<", ">", "( )", ",", ".", and/or the like.

It should be appreciated that special characters may often be transcribed into one or more word tokens instead of special character tokens. For example, the transcription 182 may include the word tokens "less than" instead of the special character token "<." As such, as shown in FIG. 3A, the query processing engine 110 may be configured to replace, in the transcription 182 of the query 140, one or more word tokens with the corresponding special character tokens present in the special character dictionary. Moreover, the query processing engine 110 may identify, as literal tokens, every token present in the transcription 182 that is not determined to be a keyword token or a special character token by being present in the keyword dictionary or the special character dictionary. The query processing engine 110 may replace the literal tokens present in the transcription 182 with neutral placeholders to generate the masked transcription 310 for structure determination. For instance, in the example of the query 140 shown in FIG. 1B, the literal tokens that are present in the transcription 182 may be replaced with the placeholders $x_1$, $x_2$, $x_3$, $x_4$, and $x_5$ to generate the masked transcription "SELECT $x_1$ FROM $x_2$ $x_3$ $x_4$=$x_5$."

Referring again to FIG. 3A, the query processing engine 110 may be configured to identify and index a plurality of ground truth query strings. As used herein, a ground truth query string may refer to a sequence of tokens that is consistent with the lexicon and syntax of the underlying query language (e.g., structured query language (SQL) and/ or the like). For example, "SELECT x FROM x=x" may be a ground truth query string consistent with the lexicon and syntax of structured query language (SQL) whereas "FROM x ORDER BY x SELECT x" is not. It should be appreciated that a ground truth query string may include any quantity of tokens. As such, in some example embodiments, the query processing engine 110 may identify and index ground truth query strings that include no more than a threshold quantity (e.g., 50 or a different quantity) of tokens.

The query processing engine 110 may perform structure determination on the masked transcription 310 by at least comparing the masked transcription 310 to at least a portion of the ground truth query strings included in the index 160. In some example embodiments, to minimize the memory footprint of the index 160 as well as the latency associated with searching the index 160, the query processing engine 110 may generate the index 160 to include a plurality of tries, each of which storing ground truth query strings having a certain quantity of tokens. For instance, the index 160 may include a first trie storing ground truth query strings including an n quantity of tokens and a second trie storing ground truth query strings including an n+1 quantity of tokens.

A trie storing ground truth query strings having an n quantity of tokens may include a plurality of nodes. For example, a root node of the hash trie may include pointers to a first plurality of children nodes while each of the first plurality of children nodes may include pointers to a second plurality of children nodes. Inserting a ground truth query string into the trie may include traversing, based at least on the tokens included in the ground truth query string, the trie to identify a node at which to store the ground truth query string. For example, the query processing engine 110 may traverse the trie from the root node of the hash trie to a first node in the first plurality of children nodes that corresponds to a first token in the ground truth query string. The ground truth query string may be stored at that first node if the first node is unused (e.g., not already storing a different ground truth query string). Alternatively, the query processing engine 110 may continue to traverse the trie from the first node to a second node in one of the second plurality of children nodes corresponding to a second token in the ground truth query string.

In some example embodiments, the query processing engine 110 may search the index 160 for a ground truth query string that is same or similar to the masked transcription 310. For instance, the query processing engine 110 may traverse one or more of the tries included in the index 160 to identify a ground truth query string having a minimum edit distance relative to the masked transcription 310. It should be appreciated that edit distance may quantify the dissimilarity between the masked transcription 310 and a ground truth query string based on a quantity of operations required to transform the masked transcription 310 into the ground truth query string. Moreover, the edit distance between the masked transcription 310 and the ground truth query string may be determined by applying a variety of techniques. For example, the query processing engine 110 may compute a Levenshtein distance, which may account for the insertion, deletion, as well as substitution of tokens. Alternatively, the query processing engine 110 may compute a longest common subsequence edit distance, which may account for the insertion and deletion of tokens but not the substitution of tokens.

Automatic speech recognition techniques may be more likely to correctly transcribe some types of tokens than other types of tokens appearing in the query 140. For instance, the transcription 182 of the query 140 may be more likely to include a correctly transcribed keyword tokens than special character tokens. Accordingly, in some example embodiments, the query processing engine 110 may compute edit distance by at least assigning, to each operation editing a token in the masked transcription 310, a weight corresponding to the type of token being edited. For example, the query processing engine 110 may assign a first weight $W_K$ to an operation editing a keyword token, a second weight $W_S$ to an operation editing a special character token, and a third weight $W_L$ to an operation editing a literal token. The first weight $W_K$ may be greater than the second weight $W_S$ which may in turn be greater than the third weight $W_L$ (e.g., $W_K > W_S > W_L$) to at least reflect the fact that keyword tokens are more likely to be transcribed correctly than special character tokens. It should be appreciated that the absolute values of the first weight $W_K$, the second weight $W_S$, and the third weight $W_L$ may be less critical than the relative values of the weights in determining the accuracy and consistency of the query processing engine 110.

Figure 3B:
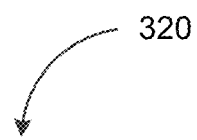
FIG. 3B depicts an example of a matrix for computing edit distance, in accordance with some example embodiments.

To further illustrate, FIG. 3B depicts a matrix 320 for computing edit distance, in accordance with some example embodiments. Referring to FIGS. 3A-B, compute the edit distance between the masked transcription 310 (e.g., SELECT x x FROM x) and a ground truth query string 330 (e.g., SELECT * FROM x), the query processing engine 110 may apply a dynamic programming algorithm to compute the matrix 320. Table 1 below depicts pseudo programming code implementing an example of the dynamic programming algorithm for computing the matrix 320.

TABLE 1

Algorithm 1 Dynamic Programming Algorithm

```
 1: if token in KeywordDict then W_token = W_K
 2: else if token in SplCharDict then W_token = W_S
 3: else W_token = W_L
 4: dp(i,0) = i for 0 ≤ i ≤ n; dp(0,j) = j for 0 ≤ j ≤ m
 5: if a(i) == b(j) then dp(i,j) = dp(i-1,j-1) = DpPrvCol(row-1)
 6: else dp(i,j) = min(W_token+dp(i-1,j), W_token+dp(i,j-1)
 7: DpPrvCol(row) = dp(i,j-1)
 8: DpCurCol(row-1) = dp(i-1,j)
 9: insertCost = DpPrvCol(row) + W_token
10: deleteCost = DpCurCol(row-1) + W_token
```

In the example of the dynamic programming algorithm shown in Table 1, $a = a_1 a_2 a_3 \ldots a_n$ may denote the masked transcription 310, $b = b_1 b_2 b_3 \ldots b_m$ may denote a ground truth query string included in the index 160 (e.g., the ground truth query string 330), dp may denote a matrix (e.g., the matrix 320) with m+1 columns and n+1 rows, and dp(i, j) may denote the edit distance between the prefix $a_1 a_2 \ldots a_i$ and $b_1 b_2 \ldots b_j$.

It should be appreciated that the computation of dp(i, j) requires only the previous column (DpPrvCol) and the current column (DpCurCol) of the matrix dp. Moreover, the search through the index 160 may stop if, for a node n, the minimum value in a current column is greater than the minimum edit distance (e.g., min(DpCurCol)>MinEditDist.

Accordingly, in some example embodiments, the query processing engine 110 may optimize the search through the index 160 by at least pruning the quantity of tries that is traversed as part of the search. For example, for each trie included in the index 160, the query processing engine 110 may determine an upper bound and a lower bound for the edit distance required to transform the masked transcription 130 to a ground truth query string in the trie. Instead of traversing every trie in the index 160, the query processing engine 110 may avoid traversing at least some of the tries in the index 160 based on the upper bounds and lower bounds associated with the tries.

Figure 3C:
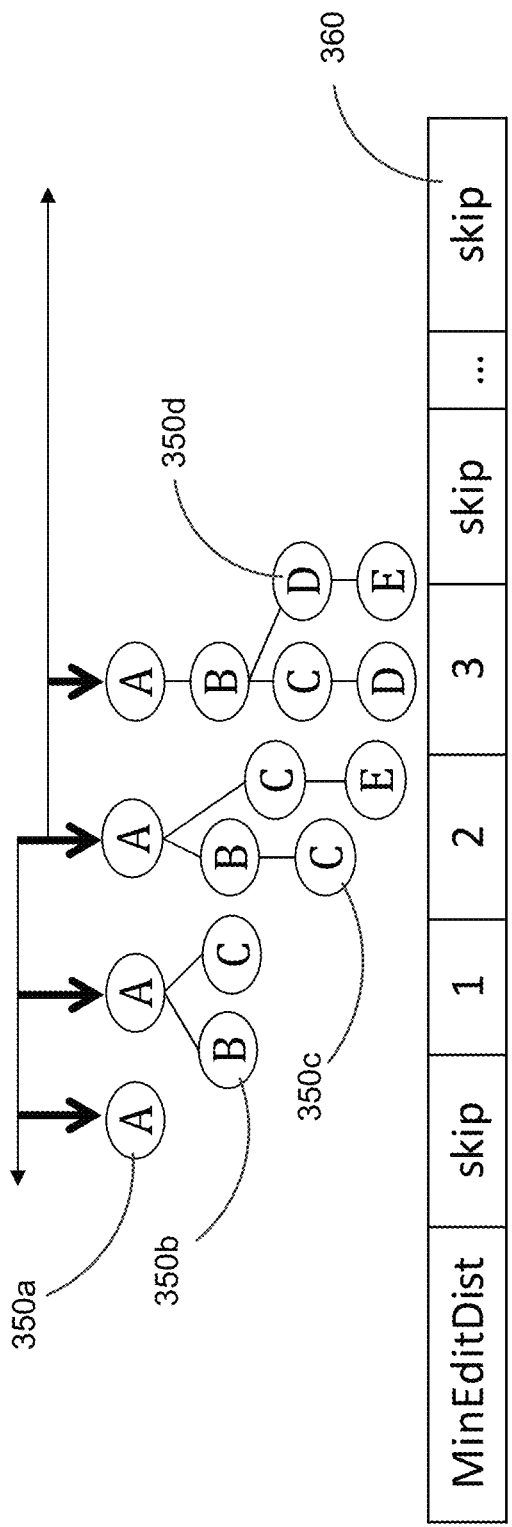
FIG. 3C depicts an example of bidirectional bounds for pruning string tries, in accordance with some example embodiments.

To further illustrate, FIG. 3C depicts an example of bidirectional bounds for pruning string tries, in accordance with some example embodiments. Given a source query string having an n quantity of tokens (e.g., the masked transcription 310 a=$a_1 a_2 a_3 \ldots a_n$) and a target query string having an m quantity of tokens (e.g., the ground truth query string b=$b_1 b_2 b_3 \ldots b_m$) where m>n, the lowest possible edit distance may be an m−n quantity of delete operations while the highest edit distance may be an m quantity of delete operations and an n quantity of insert operations. Accordingly, the edit distance d between the two query strings with an n and an m quantity of tokens respectively may be denoted by Equation (1) below:

$$|m-n| \cdot W_L \leq d \leq |m+n| \cdot W_K \quad (1)$$

wherein, as noted, $W_L$ may denote the weight of an operation editing a literal token and $W_K$ may denote the weight of an operation editing a keyword token. The value of $W_L$ may be less than that of $W_K$ to reflect the fact that the query processing engine 110 may apply an automatic speech recognition technique that is more likely to correctly transcribe a keyword token than a literal token.

As noted, each trie included in the index 160 may store ground truth query strings having a certain quantity of tokens. Accordingly, for a trie storing ground truth query strings having an m quantity of tokens, the query processing engine 110 may determine the query processing engine 110 may determine a lower bound representative of the best case scenario in which the n quantity of tokens in the masked transcription 310 may be transformed into the m quantity of tokens in one of the ground truth query strings with an |m−n| quantity of delete operations and a minimum possible weight of $W_L$. The query processing engine 110 may also determine an upper bound representative of the worst case scenario in which the n quantity of tokens in the masked transcription 310 may be transformed into the m quantity of tokens in one of the ground truth query strings with an |m+n| quantity of delete and insert operations as well as a maximum possible weight of $W_K$.

In the example show in FIG. 3C, TransOut may denote the masked transcription 310, which may include three tokens (e.g., A B A). Meanwhile, the tries in the index 160 may be indexed with keys with values corresponding to the quantity of tokens m forming the ground truth query strings in each trie (e.g., 1 to 50). For example, a first trie 350a may be associated with the key value "1" because the first trie 350a may store query strings formed from a single token whereas a second trie 350b may be associated with the key value "2" because the second trie 350b may store query strings formed from two tokens. The first row in table 340 may include, for each trie, a tuple [$b_{lower}$, $b_{upper}$] indicating the lower bound and the upper bound (e.g., the range of edit distance) for the trie. For instance, for the first trie 350a storing ground truth query strings with a length of one token (e.g., m=1), the lowest possible edit distance between a ground truth query string in the trie and the masked transcription 310 denoted by TransOut is 2 while the highest possible edit distance is 8.4. Meanwhile, for the second trie 350b storing ground truth query strings with a length of two tokens (e.g., m=2), the lowest possible edit distance between a ground truth query string in the trie and the masked transcription 310 denoted by TransOut is 1 while the highest possible edit distance is 6.

In some example embodiments, the query processing engine 110 may commence the search through the index 160 by at least traversing the trie associated with the lowest possible edit distance. In the example shown in FIG. 3C, the query processing engine 110 may start at a third trie 350c storing ground truth query strings with a length of three tokens (e.g., m=1) because the third trie 350c is associated with the lowest possible edit distance of 0. Subsequent to traversing the third trie 350c, the query processing engine 110 may determine that the actual minimum edit distance MinEditDist associated with the third trie 350c is 2 (as shown in table 360). Accordingly, the query processing engine 110 may continue the search through index 160 by identifying another trie whose lowest possible edit distance is less than the minimum edit distance MinEditDist associated with the third trie 350c. Meanwhile, the query processing engine 110 may prune away any tries whose minimum possible edit distance is greater than 2.

For instance, in the example shown in FIG. 3C, the second trie 350b may be associated with a lowest possible edit distance of 1, which is less than the minimum edit distance MinEditDist associated with the third trie 350c. The query processing engine 110 may therefore continue the search through the index 160 by traversing the second trie 350b, upon which the query processing engine 110 may determine that the minimum edit distance MinEditDist associated with the second trie 350b is 1 (as shown in table 360). At this point, the query processing engine 110 may determine to skip traversing the first trie 350a based at least on the minimum possible edit distance of the first trie 350a being greater than the minimum edit distance MinEditDist of the second trie 350b. Likewise, the query processing engine 110 may determine to skip traversing the tries associated with key values greater than "4" because the minimum possible edit distance of those tries also exceed the minimum edit distance MinEditDist of the second trie 350b. The query processing engine 110 may continue the search through the index 160 by traversing a fourth trie 350d because the minimum possible edit distance of the fourth trie 350d is not less than the minimum edit distance MinEditDist of the second trie 350b. Nevertheless, as shown in table 360, the minimum edit distance MinEditDist of the fourth trie 350d is in fact greater than the minimum edit distance MinEditDist of the second trie 350b. Accordingly, the query processing engine 110 may determine that the ground truth query string that is most similar to the masked transcription 310 denoted as TransOut is a ground truth query string with a length of two tokens (e.g., m=2) from the second trie 350b.

To further illustrate, Table 2 below depicts pseudo programming code implementing an example of the structure determination algorithm that may be applied by the query processing engine 110 to identify, in the index 160, a ground truth query string that is the most similar to the masked transcription 310 corresponding to the query 140.

TABLE 2

Algorithm 2 Structure Determination Algorithm

```
 1: Let k = Max Tokens possible in GrndTrth (50)
 2: LowerBound = Array of size k; MinEditDist = INT_MAX
 3: m = CountTokens(TransOut); result[MinEditDist] = ""
 4: for i from i to k do
 5:    LowerBound[i] = |m−i|*W_L
 6: for j from m to 0 do
 7:    if MinEditDist < LowerBound[j] then j−−
 8:    else SearchTrie(j)
 9: for j from m to k do
10:    if MinEditDist < LowerBound[j] then j++
11:    else SearchTrie(j)
12: return result[MinEditDist]
13:
14: procedure SEARCHTRIE(j)
15:    TrieRoot = RetrieveStrings(j):
16:    DpPrvCol = [1,2,...,m]
17:    for token in TrieRoot.children do
18:       SearchRecursively(TrieRoot.children[token],token,DpPrvCol)
19:
20: procedure SEARCHRECURSIVELY(node,token,DpPrvCol):
21:    rows = CountTokens(MaskOut) + 1
22:    DpCurCol = [DpPrvCol[0]+1]
23:    for row from 1 to rows do
24:       if MaskOut[row−1] == token then
25:          DpCurCol.append(DpPrvCol[row−1])
26:       else
27:          if DpPrvCol[row] < DpCurCol[row−1] then
28:             insertCost = DpPrvCol[row] + W_token
29:             DpCurCol.append(insertCost)
30:          else
31:             deleteCost = DpCurCol[row−1] + W_token
32:             DpCurCol.append(deleteCost)
33:    if node leaf and DpCurCol[rows] < MinEditDist then
34:       MinEditDist = DpCurCol[rows]
35:       result[MinEditDist] = node.sentence
36:    if min(DpCurCol) ≤ MinEditDist then
37:       for token in node.children do
38:          SearchRecursively(node.children[token],token,DpCurCol)
```

As shown in Table 2, the search of the index 160 may exclude one or more tries that are pruned based on the bidirectional bounds determined based on Equation (1). For the tries that are not pruned, the query processing engine 110 may recursively traverse every children of the root node using a SearchRecursively procedure. At every node, the query processing engine 110 may apply the dynamic programming algorithm shown in Table 1 to compute an edit distance with TransOut, and build a column of the matrix 320 shown in FIG. 3B. When the query processing engine 110 reach a leaf node of a trie and determine that the edit distance of current node is less than the current value of MinEditDist, the query processing engine 110 may update the value of MinEditDist as well as the corresponding structure (e.g., node. sentence). It should be appreciated that the search algorithm shown in Table 2 does not affect accuracy. That is, the query processing engine 110 return the same ground truth query string whether the search traverses every trie or only the tries that have not been pruned based on the bidirectional bounds. The worst case time complexity of the search algorithm shown in Table 2 may be O (pkn) while the space complexity of the search algorithm may be O (pk), wherein n may denote the quantity of tokens in the masked transcription 310 (e.g., TransOut), p may denote the quantity of nodes in the largest trie in the index 160, and k may denote the quantity of tries in the index 160.

In some example embodiments, the query processing engine 110 may further optimize the search of the index 160 by skipping over one or more branches during the traversal of the tries included in the index 160. For example, it should be appreciated that many query strings and the corresponding paths in the tries may differ in only a single token that originates from the keyword set {AVG, COUNT, SUM, MAX, MIN}, the keyword set {AND, OR}, or the special character set {=, <, >}. The union of these three sets may form a prime superset. Instead of exploring all the branches of a trie, the query processing engine 110 may skip branches that differ only in one token from the prime superset. To further illustrate, consider a trie T and the masked transcription 310 denoted as TransOut. A node n in the trie T may have a p quantity of children nodes (e.g., $C_i$, $1 \leq i \leq p$) belonging to any set in the prime superset while $C_k$ may denote a child node that is part of a ground truth query string having the minimum edit distance relative to TransOut. Since the other sibling nodes $C_i$, $i \neq k$ is not part of the ground truth query string with the minimum edit distance relative to TransOut, the query processing engine 110 may skip exploration of all the nodes descending from the sibling nodes $C_i$, $i \neq k$. That is, for every children $C_i$ of a node in the prime superset, the query processing engine 110 may explore the node determined based on $argmin_i$ ($DpCurCol_{C_i}$(lastrow)). The optimization to skip over certain branches may prevent the query processing engine 110 from identifying the ground truth query string that is the most similar to the masked transcription 310 corresponding to the query 140. Nevertheless, the decrease in accuracy may be minimal and correctable with minimal effort from the user 125 using the user interface 145.

As noted, the index 160 may store ground truth query strings in one or more data structures other than a plurality of tries, each of which storing ground truth query strings having a certain quantity of tokens. For instance, the index 160 may store ground truth query strings in inverted indices instead of tries. The inverted indices may map, for example, each unique keyword in the lexicon of a query language (e.g., structured query language (SQL) and/or the like) to the ground truth query strings containing the keyword. In the event the masked transcription 310 includes multiple keywords, the query processing engine 110 may select one or more of the inverted indices containing a fewest quantity of ground truth query strings to reduce computation time.

Figure 4:
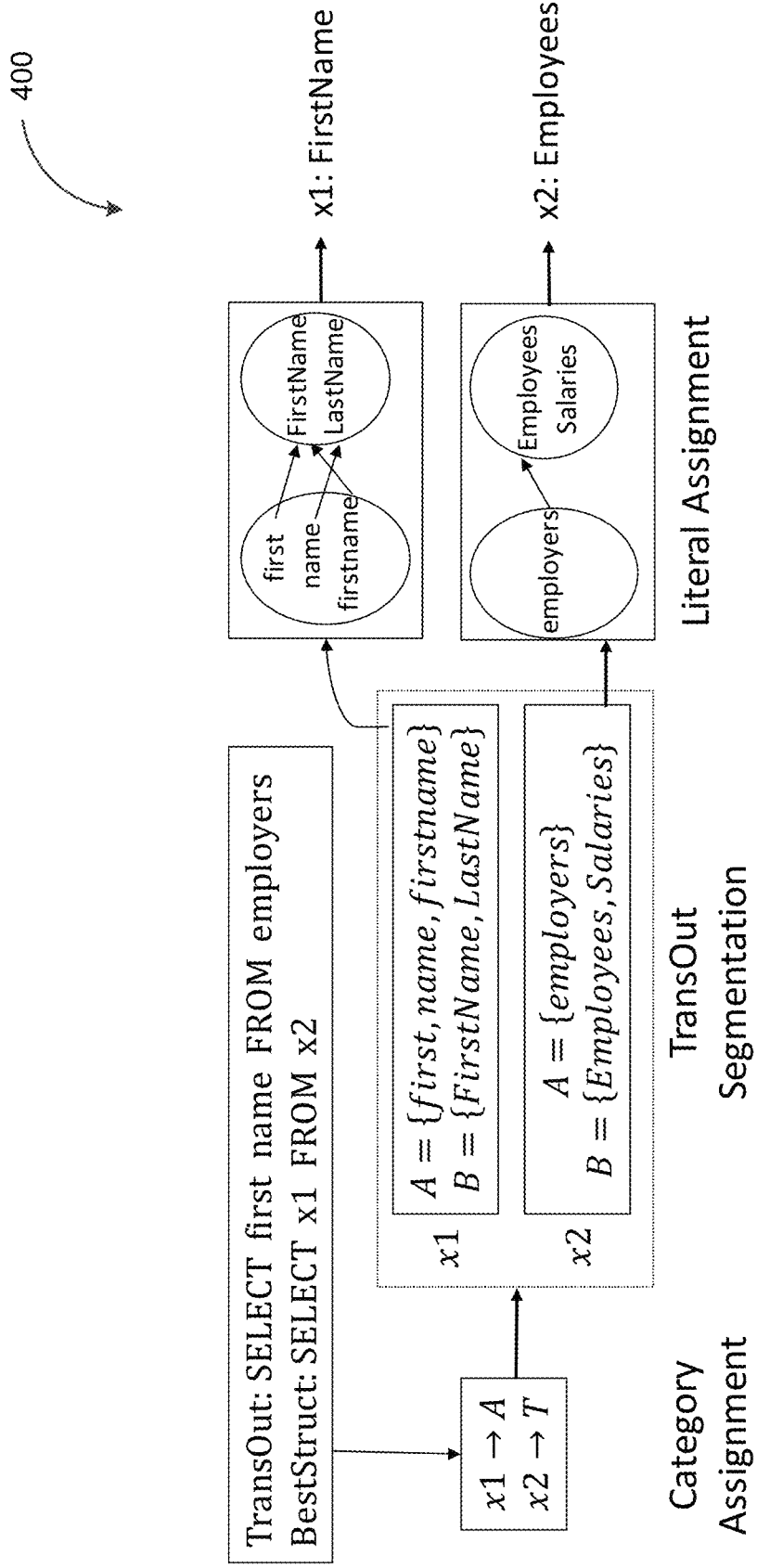
FIG. 4 depicts a block diagram illustrating an example of a process for literal determination, in accordance with some example embodiments.

Referring again to FIG. 1B, upon performing a structure determination on the masked transcription 310 and identifying the syntactically correct query string 184, the query processing engine 110 may continue processing the query 140 by at least performing a literal determination. To further illustrate, FIG. 4 depicts a block diagram illustrating an example of a process 400 for literal determination, in accordance with some example embodiments. In some example embodiments, the query processing engine 110 may perform the literal determination in order to identify the literal tokens present in the syntactically correct query string 184. As noted, these literal tokens may have been replaced with neutral placeholders during the performance of structure determination. Accordingly, the syntactically correct query string 184 and the masked transcription 310 may each include placeholders in place of the literal tokens.

As shown in FIG. 4, placeholders in the syntactically correct query string 184 denoted as BestStruct may be associated with a category. The category for a placeholder may be determined based at least on the syntax of the underlying query language (e.g., structured query language (SQL) and/or the like). For instance, each placeholder in the syntactically correct query string 184 may be assigned to category T for table names, category A for attribute names, or category V for attribute values. According to the grammar of structured query language (SQL), the literal token $x_1$ appearing after the keyword token SELECT may be an attribute name from category A while the literal token $x_2$ appearing after the keyword token FROM may be a table name from category T.

The vocabulary for each category of literal tokens may be limited based on the values that are present in the database 150. Thus, in some example embodiments, to identify a literal token in the syntactically correct query string 184, the query processing engine 110 may compare the phonetic representations of the corresponding literal token from the transcription 182 and the phonetic representations of literal tokens present in the database 150 under the same category. For example, in the example shown in FIG. 4, the query processing engine. The query processing engine 110 may identify a literal token in the syntactically correct query string 184 that has been designated as a table name by comparing the phonetic representation of that literal token only to the phonetic representations of table names present in the database 150 as enumerated in set B. The query processing engine 110 may perform the comparison by at least computing an edit distance between the phonetic representation of the literal token in the syntactically correct query string 184 and the phonetic representation of each table name present in the database 150. The query processing engine 110 may select the table name that is most similar to the literal token by at least selecting the table name whose phonetic representation has the minimum edit distance from the phonetic representation of the literal token.

The accuracy of the literal determination may be compromised by a tendency for the automatic speech recognition technique applied by the query processing engine 110 to split a single literal token in the query 140 dictated by the user 125 into multiple literal tokens in the transcription 182 of the query 140. The improperly split tokens may thwart subsequent efforts by the query processing engine 110 to correctly identify the literal token. As such, in some example embodiments, the query processing engine 110 may perform literal determination by at least identifying at least a portion of the possible substrings that may be formed by combining adjacent literal tokens in the transcription 182 of the query 140. For example, as shown in FIG. 4, the query processing engine 110 may generate, for the literal tokens "first" and "name" in the transcription 182, a set A that includes at least a portion of the possible substrings that may be formed from the literal tokens "first" and "name." The query processing engine 110 may likewise generate, for the literal token "employers" in the transcription 182, a set A that includes at least a portion of the possible substrings that may be formed from the literal token "employers."

It should be appreciated that the query processing engine 110 may not identify all possible substrings that may be formed from adjacent literal tokens in the transcription 182. Instead, the query processing engine 110 may apply a WindowSize parameter to at least limit the quantity of tokens that may be included in each substring. For example, by setting the WindowSize parameter to a certain value, the query processing engine 110 may prevent certain quantities of improperly split literal tokens from being merged during literal determination. As such, the value of the WindowSize parameter may be directly proportional to the accuracy of the literal determination performed by the query processing engine 110. By setting the WindowSize parameter to a higher value may increase the accuracy of the literal determination. However, by setting the WindowSize parameter to a lower value, the query processing engine 110 may perform literal determination with low latency.

Referring again to FIG. 4, upon determining a set A and a set B for each of the literal tokens $x_1$ and $x_2$ in the syntactically correct query string 184 denoted as BestStruct, the query processing engine 110 may assign a value to each of the literal tokens $x_1$ and $x_2$ by comparing the phonetic representations in set A to the phonetic representations in set B to find a match with a minimum edit distance. This edit distance may be computed at character level. Moreover, the query processing engine 110 may avoid a naïve pairwise comparison by applying a literal voting algorithm. For example, the query processing engine 110 may compute, for each item a in the set A associated with the literal token $x_1$, an edit distance relative to every item in the set B associated with the literal token $x_1$. The item a is said to have voted for an item b from set B by having a minimum edit distance relative to item b. FIG. 4 depicts these votes as arrows from item a in set A to item b in set B. When an edit distance has been computed for each item a in set A, the query processing engine 110 may return the items from set B (e.g., "First-Name") with a top k quantity of votes (e.g., having a minimum edit distance relative to a highest quantity of items in set A). Alternatively, the query processing engine 110 may, to the literal token $x_1$, the value of the from set B with the largest quantity of votes and/or a quantity of votes exceeding a threshold value.

Table 3 below depicts pseudo programming code implementing an example of the literal determination algorithm that may be applied by the query processing engine 110.

TABLE 3

Algorithm 3 The Literal Determination Algorithm

```
 1: procedure LITERALFINDER(TransOut,BestStruct):
 2:   RunningIndex = 0; FilledOut = BestStruct
 3:   for every placeholder x_j in BestStruct do
 4:     while TransOut(RunningIndex) ∈ (KeywordDict or SplCharDict) do
 5:       RunningIndex++
 6:     BeginIndex(x_j) = RunningIndex
 7:     EndIndex(x_j) = RightmostNonLiteral(RightNonLiteral(x_j))
 8:     A, positions = EnumerateStrings(BeginIndex(x_j), EndIndex(x_j)))
 9:     B = RetrieveCategory(x_j)
10:     literal, k = LiteralAssignment(A,B,positions)
11:     FilledOut(x_j) = literal
12:     RunningIndex = k+1
13:   return FilledOut
14:
15: procedure ENUMERATESTRINGS(BeginIndex, EndIndex):
16:   results = { };positions = { }; i = 0
17:   while i ≠ EndIndex do
18:     j = i; k=0; curstr = ""
19:     while TransOut(j) ∉ (KeywordDict or SplCharDict) AND (j < EndIndex) AND (k < WindowSize) do
20:       curstr = curstr + TransOut(j)
21:       results.append(PhoneticRop(curstr))
22:       positions.append(j)
23:       j++;k++
24:     i++
25:   return results, positions
26:
27: procedure LITERALASSIGNMENT(A, B, positions):
28:   for every item b in B do
29:     Initialize count(b) = 0; location(b) = −1
30:   for every item a in A do
31:     set(a) = φ; minEditDist = ∞
32:     for every item b in B do
33:       if EditDist(a,b) < minEditDist then
34:         set(a) = φ; set(a).add(b)
35:         minEditDist = EditDist(a,b)
36:       else if EditDist(a,b) == minEditDist then
37:         set(a).add(b)
38:     for every item b in set(a) do
39:       count(b)++
40:       location(b) = max(location(b),positions(a))
41:   literal = argmax_{b∈B} (count(b))
```

TABLE 3-continued

Algorithm 3 The Literal Determination Algorithm

42: k = location(b)
43: return literal, k

Figure 5:
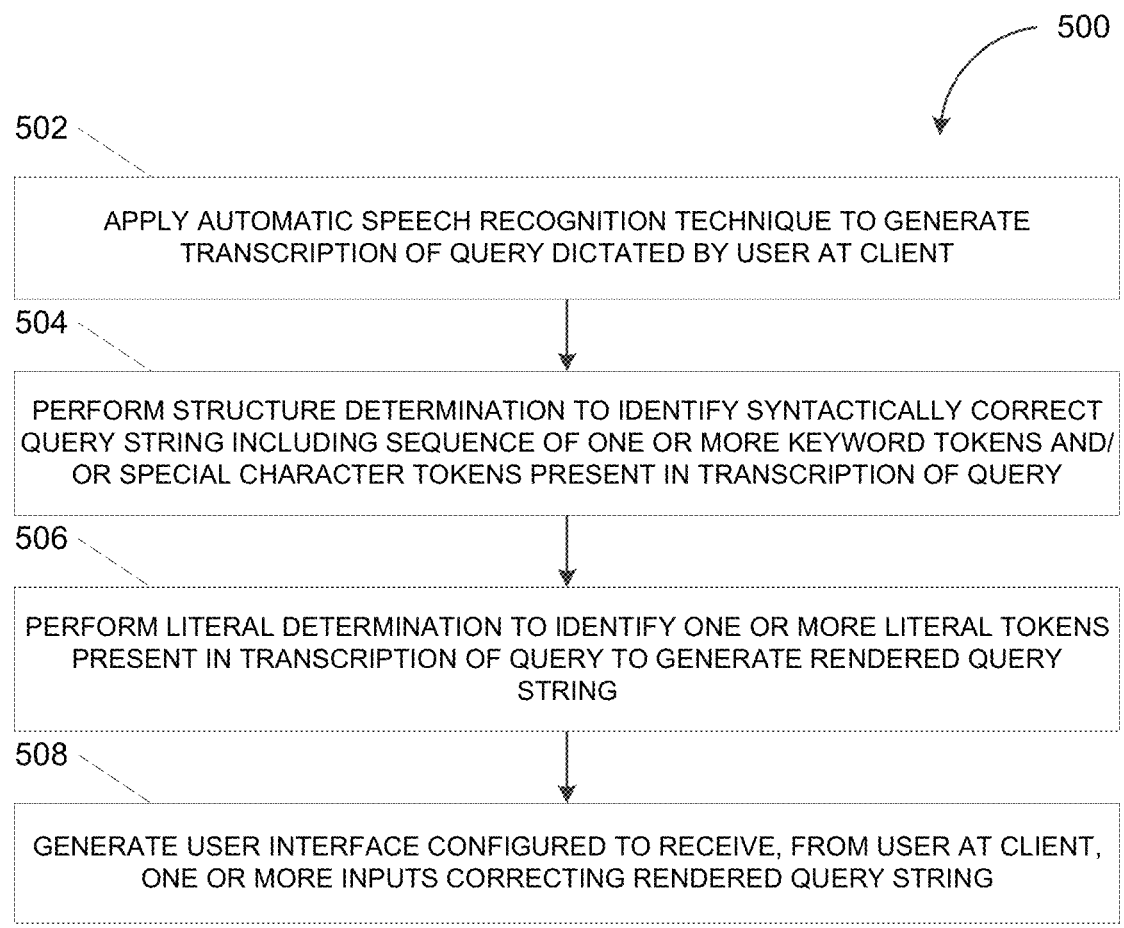
FIG. 5 depicts a flowchart illustrating an example of a process for processing a spoken structured query, in accordance with some example embodiments.

FIG. 5 depicts a flowchart illustrating an example of a process 500 for processing a spoken structured query, in accordance with some example embodiments. Referring to FIGS. 1A-B, 2, 3A-C, and 4-5, the process 500 may be performed by the query processing engine 110 in order to process, for example, the query 140 dictated by the user 125. The query 140 may be formed based on a query language including, for example, structured query language (SQL) and/or the like.

At 502, the query processing engine 110 may apply an automatic speech recognition technique to generate a transcription of a query dictated by a user. For example, as shown in FIGS. 1A-B, the user 125 may dictate the query 140 which, as noted, may be formed based on a query language such as, for example, structured query language (SQL) and/or the like. The client 120 may receive an audio signal corresponding to the dictation of the query 140. The query processing engine 110 may process the query 140 by at least applying, to the audio signal corresponding to the dictation of the query 140, an automatic speech recognition technique to generate the transcription 182. As noted, the transcription 182 may include one or more errors due to limitations associated with the automatic speech recognition technique. For instance, the transcription 182 may include one or more tokens that do not correspond to the tokens that are actually present in the query 140. To correct the errors that may be present in the transcription 182, the query processing engine 110 may further process the transcription 182 by at least performing a structure determination and a literal determination.

At 504, the query processing engine 110 may perform a structure determination in order to identify a syntactically correct query string including a sequence of one or more keyword tokens and/or special character tokens present in the transcription of the query string. For example, the query processing engine 110 may perform structure determination based at least on the index 160, which may enumerate at least a portion of the ground truth query strings that are consistent with the lexicon and the syntax of the query language associated with the query 140. The query processing engine 110 may search the index 160 to identify a ground truth query string that is most similar to the transcription 182 by having a minimum edit distance relative to the masked transcription 310, which corresponds to a version of the transcription 182 in which literal tokens have been replaced with neutral placeholders. The query processing engine 110 may therefore perform the structure determination based on the keyword tokens and special character tokens included in the masked transcription 310.

As noted, the index 160 may include one or more data structures optimized for the search of a ground truth query string having a minimum edit distance relative to the masked transcription 310. Referring now to FIGS. 3A-C, the index 160 may include a plurality of tries, each of which storing ground truth query strings having a certain quantity of tokens. Accordingly, the query processing engine 110 may search the index 160 by traversing at least some of the tries included in the index 160. To optimize the search through the index 160, the query processing engine 110 may avoid traversing at least some of the tries based on a lower bound and an upper bound associated with each trie. The lower bound for a trie may correspond to the lowest possible edit distance between a ground truth query string in the trie and the masked transcription 310 while the upper bound may correspond to the highest possible edit distance between a ground truth query string in the trie and the masked transcription 310.

In the example shown in FIG. 3C, the query processing engine 110 may start the search through the index 160 by traversing the third trie 350 based at least on the third trie 350c having the smallest lower bound at 0. By traversing the third trie 350c, the query processing engine 110 may determine that the actual minimum edit distance between the transcription 310 and a ground truth query string in the third trie 350c is 2. To continue the search through the index 160, the query processing engine 110 may traverse a trie whose lower bound is lower than the minimum edit distance determined for the third trie 350c. In the example shown in FIG. 3C, the query processing engine 110 may traverse the second trie 350b after the third trie 350c to determine a minimum edit distance of 1 for the second trie 350b. Based on the minimum edit distance of the second trie 350b, the query processing engine 110 may prune the tries whose lower bounds are higher than the minimum edit distance of the second trie 350b including, for example, the first trie 350a. The query processing engine 110 may still be required to traverse the fourth trie 350d because the lower bound of the fourth trie 350d is not lower than the minimum edit distance of the second trie 350b. Nevertheless, the query processing engine 110 may complete the search of the index 160 after traversing the fourth trie 350d because the lower bounds of the remaining tries in the index 160 are all higher than the minimum edit distance of the second trie 350b. It should be appreciated that the syntactically correct query string 184 identified by the query processing engine 110 may corresponding to a ground truth query string in the index 160 having a minimum edit distance relative to the masked transcription 310 of the query 140. The syntactically correct query string 184 may each include placeholders in place of literal tokens, which the query processing engine 110 may identify by performing a literal determination.

At 506, the query processing engine 110 may perform a literal determination to identify one or more literal tokens present in the transcription of the query to generate a rendered query string. Referring to FIG. 4, the query processing engine 110 may perform literal determination by at least determining a category each of the placeholders in the syntactically correct query string 184. In the example shown in FIG. 4, the query processing engine 110 may assign, based on the grammar of structured query language (SQL), the literal token $x_1$ to the category A of attribute names and the literal token $x_2$ to the category T of table names.

The vocabulary for each category of literal tokens may be limited based on the values that are present in the database 150. Thus, in some example embodiments, to identify a literal token in the syntactically correct query string 184, the query processing engine 110 may compare the phonetic representations of the corresponding literal token from the transcription 182 and the phonetic representations of literal tokens present in the database 150 under the same category. Moreover, it should be appreciated that the query processing engine 110 may identify at least a portion of the possible substrings that may be formed from adjacent literal tokens in the transcription 182 of the query 140 because of a tendency for the automatic speech recognition technique applied by the query processing engine 110 to improperly split a single literal token in the query 140 dictated by the user 125 into multiple literal tokens. In the example shown in FIG. 4, the query processing engine 110 may identify, for each of the literal tokens $x_1$ and $x_2$ in the transcription 182, a set A that includes the phonetic representations of at least a portion of the possible substrings that can be formed from each of the literal tokens $x_1$ and $x_2$. The query processing engine 110 may also identify, for each of the literal tokens $x_1$ and $x_2$ in the transcription 182, a set B that includes the phonetic representations of literal tokens present in the database 150 under the same category.

The query processing engine 110 may assign a value to each of the literal tokens $x_1$ and $x_2$ by comparing the phonetic representations in set A to the phonetic representations in set B to find a match with a minimum edit distance. In some example embodiments, the query processing engine 110 may compute, for each item a in the set A associated with the literal token $x_1$, an edit distance relative to every item in the set B associated with the literal token $x_1$. The item a is said to have voted for an item b from set B by having a minimum edit distance relative to item b. When an edit distance has been computed for each item a in set A, the query processing engine 110 may return the items from set B (e.g., "FirstName") with a top k quantity of votes (e.g., having a minimum edit distance relative to a highest quantity of items in set A). Alternatively, the query processing engine 110 may, to the literal token $x_1$, the value of the from set B with the largest quantity of votes and/or a quantity of votes exceeding a threshold value.

At 508, the query processing engine 110 may generate a user interface configured to receive, from the user, one or more inputs correcting the rendered query string. For example, the query processing engine 101 may generate the user interface 145 which, as shown in FIG. 1A, may be displayed at the client 120 to enable the user 125 to perform an interactive correction of the one or more errors that may be present in the rendered query string 186, which is generated upon the completion of literal determination. According to some example embodiments, the user interface 145 may enable the user 125 to edit individual clauses within the rendered query string 186, for example, by replacing one or more of the tokens (e.g., keyword tokens, special character tokens, and/or literal tokens) present in the rendered query string 186. The user 125 may replace the one or more tokens by at least selecting one or more of the input elements (e.g., buttons, checkboxes, buttons, sliders, drop lists, and/or the like) presented on the user interface 145 displayed at the client 120. Alternatively and/or additionally, the user 125 may edit an individual clause within the rendered query string 186 by dictating the clause for reprocessing by the query processing engine 110. The user 125 may also dictate the query 140 in its entirety in order for the query processing engine 110 to reprocess, in whole or in part, the query 140.

At 510, the query processing engine 110 may execute the rendered query string in order to retrieve, from the database, at least a portion of the data requested the query dictated by the user. For example, the query processing engine 110 may execute the rendered query string 186, which may match the query 140 originally dictated by the user 125. The rendered query string 186 may be executed in order to retrieve, from the database 150, at least a portion of the data requested by the query 140. For instance, the query processing engine 110 may execute the rendered query string 186 to retrieve, from the database 150, at least a portion of the data included in the table 155.

Figure 6:
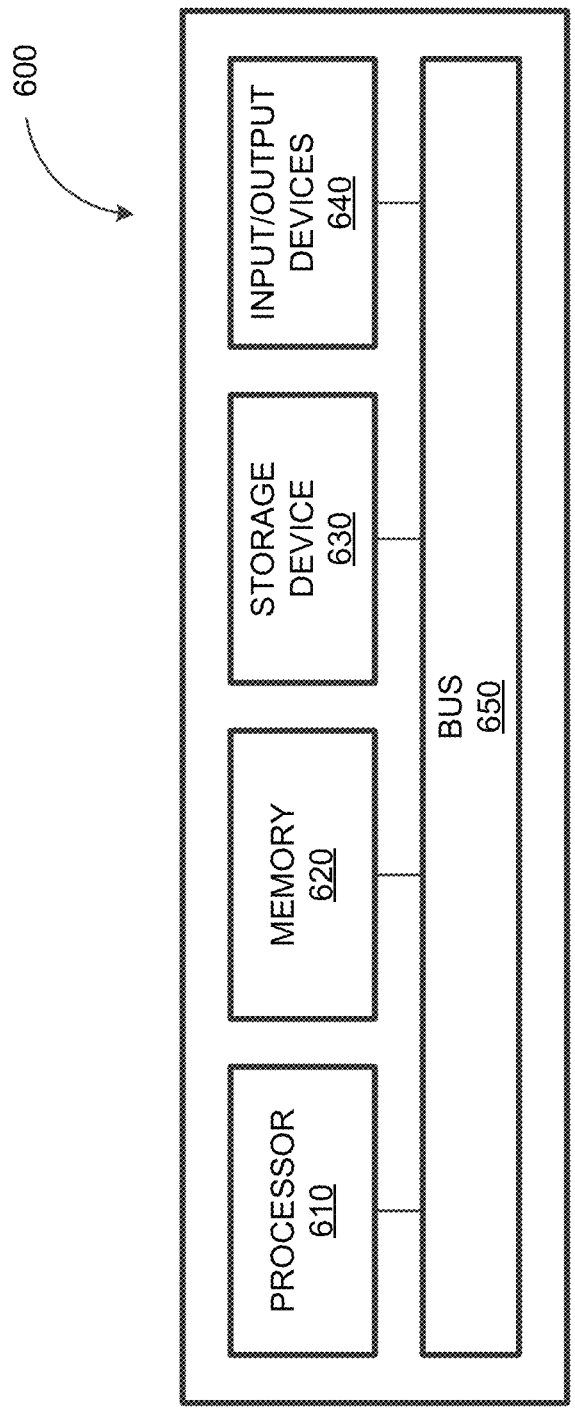
FIG. 6 depicts a block diagram illustrating a computing system, in accordance with some example embodiments.

FIG. 6 depicts a block diagram illustrating a computing system 600, in accordance with some example embodiments. Referring to FIGS. 1A-B, 2, 3A-C, and 4-6, the computing system 600 may be used to implement the query processing engine 110, the client 120, and/or any components therein.

As shown in FIG. 6, the computing system 600 can include a processor 610, a memory 620, a storage device 630, and input/output devices 640. The processor 610, the memory 620, the storage device 630, and the input/output devices 640 can be interconnected via a system bus 650. The processor 610 is capable of processing instructions for execution within the computing system 600. Such executed instructions can implement one or more components of, for example, the query processing engine 110 and/or the client 120. In some implementations of the current subject matter, the processor 610 can be a single-threaded processor. Alternately, the processor 610 can be a multi-threaded processor. The processor 610 is capable of processing instructions stored in the memory 620 and/or on the storage device 630 to display graphical information for a user interface provided via the input/output device 640.

The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a floppy disk device, a hard disk device, an optical disk device, or a tape device, or other suitable persistent storage means. The input/output device 640 provides input/output operations for the computing system 600. In some implementations of the current subject matter, the input/output device 640, which may include, for example, a keyboard, a touchscreen, an onboard microphone, pointing device, and/or the like. In various implementations, the input/output device 640 includes a display unit for displaying graphical user interfaces.

According to some implementations of the current subject matter, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

In some implementations of the current subject matter, the computing system 600 can be used to execute various interactive computer software applications that can be used for organization, analysis and/or storage of data in various (e.g., tabular) format. Alternatively, the computing system 600 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 640. The user interface can be generated and presented to a user by the computing system 600 (e.g., on a computer screen monitor, etc.).

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
    at least one processor; and
    at least one memory including program code which when executed by the at least one processor provides operations comprising:
        receiving, from a client, a query dictated by a user, the query requesting to retrieve, from a database, at least a portion of data stored in the database;
        performing, based at least on a transcription of the dictated query, a structure determination by at least identifying, in a plurality of ground truth query strings, a ground truth query string having a minimum edit distance relative to the transcription of the dictated query, each the plurality of ground truth query strings being consistent with at least a syntax of a query language associated with the dictated query;
        generating a rendered query string by at least performing a literal determination to identify a first literal token included in the identified ground truth query string, the literal determination being performed by a least assigning, based at least on the syntax of the query language associated with the dictated query, a category to the first literal token included in the identified ground truth query string, and comparing the first literal token to a second literal token present in the database under a same category; and
        executing the rendered query string to at least retrieve, from the database, data requested by the dictated query string.

2. The system of claim 1, further comprising:
    determining an edit distance between the transcription of the dictated query and at least one of the plurality of ground truth query strings, the edit distance corresponding to a quantity of operations to transform the transcription of the dictated query into the at least one of the plurality of ground truth query strings.

3. The system of claim 2, wherein the transformation includes editing a first token and a second token included in the transcription of the dictated query, wherein the first token and the second token each comprise a literal token, a keyword token, or a special character token included in the transcription of the dictated query, and wherein the edit distance is further determined by at least assigning, to each of a first operation editing the first token and a second operation editing the second token, a different weight corresponding to a respective type of the first token and the second token.

4. The system of claim 1, wherein the plurality of ground truth query strings are stored in an index including a first trie and a second trie, wherein the first trie stores at least one ground truth query string having a first quantity of tokens, and wherein the second trie stores at least one ground truth query string having a second quantity of tokens.

5. The system of claim 4, further comprising:
  determining, for the first trie, a minimum possible edit distance relative to the transcription of the dictated query; and
  performing the structure determination by at least traversing the second trie but not the first trie based at least on the minimum possible edit distance of the first trie being greater than an actual minimum edit distance relative to the transcription of the dictated query.

6. The system of claim 1, wherein the plurality of ground truth strings are stored in a plurality of inverted indices, and wherein each of the plurality of inverted indices enumerate one or more ground truth query strings containing a keyword from a lexicon of the query language associated with the dictated query.

7. The system of claim 1, wherein the query language comprises a structured query language.

8. The system of claim 1, wherein the category comprises a table name, an attribute name, or an attribute value.

9. The system of claim 1, wherein the comparing includes comparing a first phonetic representation of the first literal token to a second phonetic representation of the second literal token.

10. The system of claim 1, wherein the second literal token is identified as a match for the first literal token based at least on the second literal token having a minimum character level edit distance relative to the first literal token.

11. The system of claim 10, wherein the first literal token is adjacent to a third literal token in the identified ground truth query string, and wherein the literal determination is further performed by at least comparing, to second literal token from the database, each literal token from a set including the first literal token, the third literal token, and a fourth literal token formed by combining the first literal token and the third literal token.

12. The system of claim 11, wherein the second literal token is identified as the match for the first literal token instead of a fifth literal token from the database based at least on the second literal token having the minimum character level edit distance relative to a larger portion of the set than the fifth literal token.

13. The system of claim 1, further comprising:
  generating, for display at the client, a user interface, the user interface configured to receive, from the user, one or more inputs correcting the rendered query string.

14. The system of claim 13, wherein the user interface includes a first input element corresponding to a keyword token or a special character token consistent with a lexicon of the query language, and wherein the user interface further includes a second input element corresponding to a second literal token present in the database.

15. The system of claim 13, further comprising:
  receiving, via the user interface, an input selecting a clause in the rendered query string; and
  correcting the rendered query string by at least reprocessing the selected clause from the rendered query string.

16. The system of claim 1, further comprising:
  generating the transcription of the dictated query by at least applying, to an audio signal corresponding to the dictated query, an automatic speech recognition technique.

17. The system of claim 1, wherein the structure determination is performed based on a masked transcription generated by at least replacing the first literal token with a placeholder.

18. A non-transitory computer readable medium storing instructions, which when executed by at least one data processor, result in operations comprising:
  receiving, from a client, a query dictated by a user, the query requesting to retrieve, from a database, at least a portion of data stored in the database;
  performing, based at least on a transcription of the dictated query, a structure determination by at least identifying, in a plurality of ground truth query strings, a ground truth query string having a minimum edit distance relative to the transcription of the dictated query, each the plurality of ground truth query strings being consistent with at least a syntax of a query language associated with the dictated query;
  generating a rendered query string by at least performing a literal determination to identify a first literal token included in the identified ground truth query string, the literal determination being performed by a least assigning, based at least on the syntax of the query language associated with the dictated query, a category to the first literal token included in the identified ground truth query string, and comparing the first literal token to a second literal token present in the database under a same category; and
  executing the rendered query string to at least retrieve, from the database, data requested by the dictated query string.

19. A computer-implemented method, comprising:
  receiving, from a client, a query dictated by a user, the query requesting to retrieve, from a database, at least a portion of data stored in the database;
  performing, based at least on a transcription of the dictated query, a structure determination by at least identifying, in a plurality of ground truth query strings, a ground truth query string having a minimum edit distance relative to the transcription of the dictated query, each the plurality of ground truth query strings being consistent with at least a syntax of a query language associated with the dictated query;
  generating a rendered query string by at least performing a literal determination to identify a first literal token included in the identified ground truth query string, the literal determination being performed by a least assigning, based at least on the syntax of the query language associated with the dictated query, a category to the first literal token included in the identified ground truth query string, and comparing the first literal token to a second literal token present in the database under a same category; and
  executing the rendered query string to at least retrieve, from the database, data requested by the dictated query string.

* * * * *